US010392066B2

(12) United States Patent
Iwamoto et al.

(10) Patent No.: US 10,392,066 B2
(45) Date of Patent: Aug. 27, 2019

(54) STRADDLE-TYPE VEHICLE

(71) Applicant: KAWASAKI JUKOGYO KABUSHIKI KAISHA, Kobe-shi, Hyogo (JP)

(72) Inventors: Taro Iwamoto, Kakogawa (JP); Tomo Yamamoto, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 33 days.

(21) Appl. No.: 15/803,646

(22) Filed: Nov. 3, 2017

(65) Prior Publication Data

US 2018/0162473 A1 Jun. 14, 2018

(30) Foreign Application Priority Data

Dec. 8, 2016 (JP) ................................ 2016-238298

(51) Int. Cl.

| | |
|---|---|
| ***B62J 6/00*** | (2006.01) |
| ***B60Q 1/00*** | (2006.01) |
| ***B60Q 1/18*** | (2006.01) |
| ***B62J 6/02*** | (2006.01) |
| ***B60Q 1/04*** | (2006.01) |
| ***B60Q 1/068*** | (2006.01) |
| ***B60Q 1/12*** | (2006.01) |
| ***B60Q 1/14*** | (2006.01) |

(52) U.S. Cl.

CPC ............ *B62J 6/005* (2013.01); *B60Q 1/0035* (2013.01); *B60Q 1/0041* (2013.01); *B60Q 1/0094* (2013.01); *B60Q 1/0433* (2013.01); *B60Q 1/0683* (2013.01); *B60Q 1/12* (2013.01); *B60Q 1/1423* (2013.01); *B60Q 1/18* (2013.01); *B62J 6/001* (2013.01); *B62J 6/02* (2013.01); *B60Q 2300/136* (2013.01); *B62K 2207/00* (2013.01)

(58) Field of Classification Search

CPC ....................... B62J 2006/006; F21W 2107/17

USPC .......................................................... 362/475

See application file for complete search history.

(56) References Cited

U.S. PATENT DOCUMENTS

| | | | | |
|---|---|---|---|---|
| 6,998,970 B2 * | 2/2006 | Conte | B60Q 1/2661 | 340/432 |
| 8,550,673 B1 * | 10/2013 | Jones, Jr. | B60Q 1/12 | 362/464 |
| 10,023,103 B2 * | 7/2018 | McWithey | B60Q 1/115 | |
| 2013/0081896 A1 * | 4/2013 | Nakamura | B62J 17/02 | 180/229 |

FOREIGN PATENT DOCUMENTS

JP 2013248988 A 12/2013

* cited by examiner

*Primary Examiner* — Matthew J. Peerce

(74) *Attorney, Agent, or Firm* — Alleman Hall Creasman & Tuttle LLP

(57) ABSTRACT

A straddle vehicle which turns in a bank state in which a vehicle body is rotated around an axis extending in a vehicle length direction, includes a head lamp unit which is disposed at a front portion of the straddle vehicle and emits a light beam with which a forward region of the vehicle body is irradiated; a cornering lamp unit which is disposed at the front portion of the straddle vehicle, provided separately from the head lamp unit, and turned on in the bank state; and a duct member included in an engine air-intake system, wherein the cornering lamp unit is disposed below the head lamp unit and below an air-intake inlet of the duct member.

8 Claims, 8 Drawing Sheets

STRADDLE-TYPE VEHICLE

CROSS-REFERENCE TO RELATED APPLICATION

This application claims priority to and the benefit of Japanese Patent Application No. 2016-238298 filed on Dec. 8, 2016, the entire disclosure of which is incorporated herein by reference.

BACKGROUND OF THE INVENTION

1. Field of the Invention

The present invention relates to a straddle vehicle which turns in a bank state in which a vehicle body is rotated around an axis extending in a vehicle length direction, and includes a cornering lamp unit which is turned on in the bank state to emit a light beam with which a forward region of the vehicle body is irradiated.

2. Description of the Related Art

Among straddle vehicles which turn by rotating vehicle bodies around axes extending in a vehicle length direction, a certain straddle vehicle includes a cornering lamp unit or a sub-head-lamp light source which is turned on in a bank state to emit a light beam with which a forward region of the vehicle body is irradiated. For example, in a motorcycle disclosed in "JP 2013-248988 A", the sub-head-lamp light source is provided on a front cover located in a center portion in a vehicle width direction and disposed close to a main head lamp light source.

Typically, the light units are relatively heavy components. In the above-described layout, since the main head lamp light source and the sub-head-lamp light source are collectively disposed on the front cover, the position of center of gravity, in particular, the position of center of gravity of the front portion of the vehicle is high.

SUMMARY OF THE INVENTION

In view of the above, an object of the present invention is to lower a center of gravity of a straddle vehicle including a cornering lamp unit.

According to an aspect of the present invention, there is provided a straddle vehicle which turns in a bank state in which a vehicle body is rotated around an axis extending in a vehicle length direction, the straddle vehicle comprising: a head lamp unit which is disposed at a front portion of the straddle vehicle and emits a light beam with which a forward region of the vehicle body is irradiated; a cornering lamp unit which is disposed at the front portion of the straddle vehicle, provided separately from the head lamp unit, and turned on in the bank state; and a duct member included in an engine air-intake system, wherein the cornering lamp unit is disposed below the head lamp unit and below an air-intake inlet of the duct member.

In accordance with this configuration, since the cornering lamp unit is disposed below heavy engine constituents, the center of gravity of the straddle vehicle can be lowered. In particular, since the cornering lamp unit is disposed vertically apart from the head lamp unit, the position of the center of gravity of the front portion of the straddle vehicle is lowered.

The straddle vehicle may further comprise: a head pipe disposed at the front portion of the straddle vehicle, and the cornering lamp unit may be disposed below a lower end of the head pipe.

In accordance with this configuration, the center of gravity of the straddle vehicle can be lowered.

The cornering lamp unit may include a plurality of mounting sections attached on the vehicle body, and the plurality of mounting sections may include a plurality of upper mounting sections provided on an upper portion of the cornering lamp unit, and at least one lower mounting section provided on a lower portion of the cornering lamp unit, and the number of the plurality of upper mounting sections may be larger than the number of the at least one lower mounting section.

In accordance with this configuration, since the cornering lamp unit is mounted on the vehicle body at more points in the upper portion thereof than in the lower portion thereof, the cornering lamp unit can be suspended, and the cornering lamp unit which is a heavy constituent can be easily supported by the vehicle body.

The straddle vehicle may further comprise: a radiator which radiates heat from a coolant; and an air guiding member which guides to the radiator air flowing from a front, and the cornering lamp unit may be adjacent to the air guiding member at a location that is outward of the air guiding member in a vehicle width direction.

In accordance with this configuration, the inner portion of the cornering lamp unit in the vehicle width direction can be hidden by the air guiding member.

The straddle vehicle may further comprise: a front wheel as a steering wheel; and a front fork which supports the front wheel and is rotatable around a steering axis extending substantially in a vertical direction, the air guiding member may be disposed outward of the front fork in the vehicle width direction and the cornering lamp unit may be disposed outward of the air guiding member in the vehicle width direction, and a portion of the air guiding member, the portion facing the front fork, may have a recess depressed outward in the vehicle width direction, and the front fork is rotatable through the recess during a steering operation.

In accordance with this configuration, the cornering lamp unit is disposed outward of the front fork in the vehicle width direction, and outward of the radiator and the air guiding member in the vehicle width direction, while reducing the width (dimension in the vehicle width direction) of the front portion of the straddle vehicle.

The cornering lamp unit may extend in a straight line shape in a downward direction, as the cornering lamp unit extends in a rearward direction.

With this shape, a space in which the cornering lamp unit is disposed can be saved, and the light beam with a sufficient amount can be secured.

The straddle vehicle may further comprise: a bank angle sensor which detects a bank angle of the vehicle body; and an electronic control unit which controls turn on and off of the cornering lamp unit, the cornering lamp unit may include a left cornering lamp unit including a left light source member, and a right cornering lamp unit including a right light source member which is turned on and off, independently of the left light source member, and the electronic control unit may be configured to perform a determination process for the left light source member and the right light source member, based on the bank angle detected by the bank angle sensor, and configured to turn on the left cornering lamp unit in a left bank state in which the vehicle body is rotated to a left and turn on the right cornering lamp unit in a right bank state in which the vehicle body is rotated to a right.

According to another aspect of the present invention, there is provided a straddle vehicle which turns in a bank state in which a vehicle body is rotated around an axis extending in a vehicle length direction, the straddle vehicle comprising: a head lamp unit which is disposed at a front portion of the straddle vehicle and emits a light beam with which a forward region of the vehicle body is irradiated; a cornering lamp unit which is disposed at the front portion of the straddle vehicle, provided separately from the head lamp unit, and turned on in the bank state; and a head pipe disposed at the front portion of the straddle vehicle, wherein the cornering lamp unit is disposed below a lower end of the head pipe and extends in a straight line shape in a downward direction, from a front to a rear.

In accordance with this configuration, the center of gravity of the straddle vehicle can be lowered while reducing a space in which the cornering lamp unit is placed.

The straddle vehicle may further comprise: a cover member covering the vehicle body, wherein the cover member extends in a straight line shape in a downward direction from the front to the rear, and the cornering lamp unit may extend along an edge of the cover member.

In accordance with this configuration, the aerodynamic characteristics of the straddle vehicle including the cornering lamp unit can be improved.

The above and further objects, and advantages of the invention will more fully be apparent from the following detailed description with reference to the accompanying drawings.

DETAILED DESCRIPTION OF THE PREFERRED EMBODIMENTS

Hereinafter, the embodiment of the present invention will be described with reference to the drawings. Throughout the drawings, the same or corresponding constituents are designated by the same reference symbols, and will not be described in repetition. The directions stated below are from the perspective of a rider straddling a straddle vehicle. A vehicle length direction corresponds with a forward and rearward direction, and a vehicle width direction corresponds with a rightward and leftward direction. Outward in the vehicle width direction refers to a side which is distant in the vehicle width direction from a vehicle width center line of the vehicle. Inward in the vehicle width direction refers to a side which is closer to the vehicle width center line.

Figure 1:
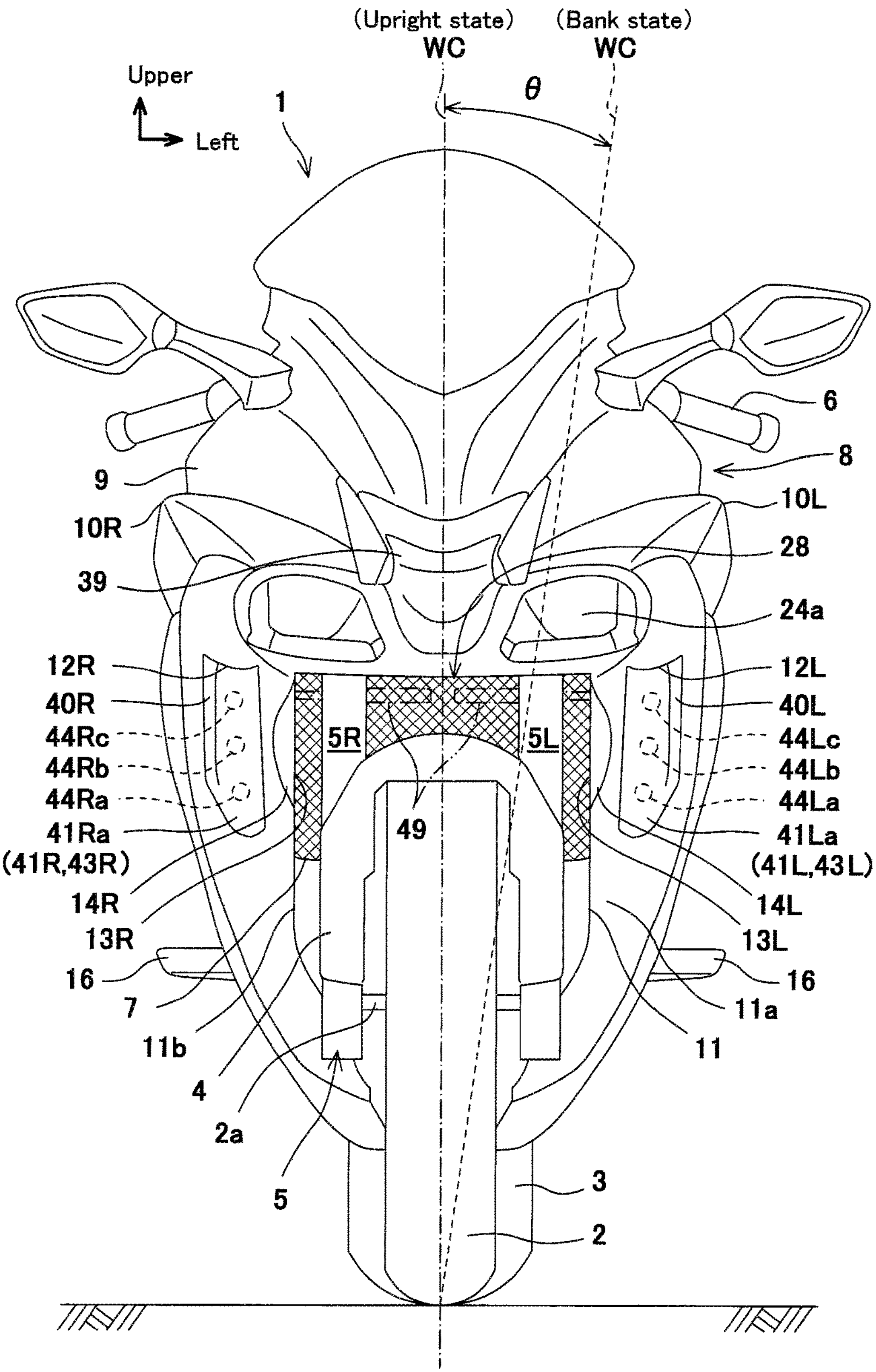
FIG. 1 is a front view of a motorcycle which is an exemplary straddle vehicle.

FIG. 1 is a front view of a motorcycle 1 which is an exemplary straddle vehicle. The motorcycle 1 includes a front wheel 2 and a rear wheel 3. A front fender 4 covers a portion (in particular, upper portion) of the front wheel 2. The front wheel 2 is a steering wheel. The front wheel 2 is rotatably supported by the lower end portions of right and left rods 5R, 5L constituting a front fork 5 via a front axle 2*a*. When the handle 6 is rotated by the rider, the front fork 5 rotates around a steering axis SA, and the direction of the front wheel 2 is changed according to the rotation of the front fork 5. The steering axis SA conforms to a vehicle width center line WC in a front view and is inclined in a rearward direction by a caster angle with respect to a vehicle height direction in a side view.

A "straight-traveling position" of the handle 6 refers to a handle position at which a steering angle is zero and the front axle 2*a* is oriented in the vehicle width direction. In a state in which the handle 6 is at the straight-traveling position, the motorcycle 1 can travel in a straight line. The motorcycle 1 is an example of a straddle vehicle which travels in a straight line in an upright state (see a dot-and-dash line of FIG. 1) at which the vehicle height direction conforms to a direction perpendicular to a ground surface. In the front view, the vehicle height direction conforms to a direction in which the vehicle width center line WC extends. In the example of FIG. 1, there is no cant, and the vehicle width center line WC in the upright state extends vertically in the front view. By rotating the handle 6 from the straight-traveling position, the motorcycle 1 can turn. The motorcycle 1 is an example of a straddle vehicle which turns in a bank state (see a broken line of FIG. 1) in which a vehicle body is rotated around an axis A extending in the vehicle length direction. The axis A is expressed as a point in the front view, and extends through a point at which the front wheel 2 is grounded and a point at which the rear wheel 3 is grounded.

In the "bank state," the vehicle height direction is inclined with respect to the direction perpendicular to the ground surface. The "bank state" includes a "left bank state" in which the vehicle body is tilted from the upright state to the left, as shown in FIG. 1, and a "right bank state" in which the vehicle body is tilted from the upright state to the right. While the motorcycle 1 is turning to the left, the vehicle body is in the left bank state. While the motorcycle 1 is turning to the right, the vehicle body is in the right bank state. The vehicle width center line WC in a state in which the vehicle body is tilted to the right or to the left is tilted with respect to the vehicle width center line WC in the upright state. Hereinafter, an angle formed between the vehicle width center line WC in a present state and the vehicle width center line WC in the upright state will be referred to as a "bank angle", and is expressed as $\theta$. The bank angle $\theta$ in the upright state is zero.

The motorcycle 1 includes a radiator 7 which radiates heat from a coolant for cooling an engine. The radiator 7 is provided at the front portion of the vehicle body. The radiator 7 is disposed rearward of the front wheel 2 and the front fender 4.

The motorcycle 1 includes a cover member 8 covering the vehicle body. For example, the cover member 8 includes a front cowling 9 covering the front upper portion of the vehicle body, a left side cowling 10L covering the left portion of the vehicle body, and a right side cowling 10R covering the right portion of the vehicle body. The front end portions of the left and right side cowlings 10L, 10R are continuous with the lower edge of the front cowling 9 and are disposed below the front cowling 9, defining the external appearance of the motorcycle 1 in the front view. The left and right side cowlings 10L, 10R define an air opening 11 through which air flowing from the front is guided to the radiator 7. The radiator 7 is disposed rearward of the air opening 11. The substantially whole of the radiator 7 can be seen through the air opening 11 from the front (to allow the radiator 7 to easily receive the air flowing from the front). The left and right side cowlings 10L, 10R cover the radiator 7 from outside in the vehicle width direction.

The motorcycle 1 includes a head lamp unit 39 and a sub-light-unit as a light (lamp) unit which emits a light beam with which a forward region of the vehicle body can be irradiated. The sub-light-unit is provided separately from the head lamp unit 39. In the present embodiment, as an example of the sub-light-unit, the motorcycle 1 includes a left cornering lamp unit 40L and a right cornering lamp unit 40R (hereinafter these will be referred to as a left CL unit 40L and a right CL unit 40R) which are turned on in the bank state. The left CL unit 40L is turned on in the left bank state. The right CL unit 40R is turned on in the right bank state. In the upright state and the left bank state, the right CL unit 40R is turned off. In the upright state and the right bank state, the left CL unit 40L is turned off.

The head lamp unit 39 is disposed at the front portion of the vehicle body and is located on the vehicle width center line WC. In the present embodiment, a parting line of the front cowling 9 and the left side cowling 10L extends to the left (outward in the vehicle width direction) from the left edge of the head lamp unit 39. Also, a parting line of the front cowling 9 and the right side cowling 10R extends to the right (outward in the vehicle width direction) from the right edge of the head lamp unit 39. The front fender 4 is disposed with a clearance in a vertical direction from the head lamp unit 39.

The left and right CL units 40L, 40R are provided at the front portion of the vehicle body. The left and right CL units 40L, 40R are disposed below the head lamp unit 39. The left and right CL units 40L, 40R are disposed close to the air opening 11, at locations which are outward of the air opening 11 in the vehicle width direction.

A housing 41L of the left CL unit 40L is adjacent to the edge of an opening 12L formed in the front lower portion of the left side cowling 10L. The housing 41L includes a lens surface 41La exposed through the opening 12L. A housing 41R of the right CL unit 40R is also adjacent to the edge of an opening 12R formed in the front lower portion of the right side cowling 10R. The housing 41R includes a lens surface 41Ra exposed through the opening 12R. The lens surfaces 41La, 41Ra have a light transmissibility. The lens surfaces 41La, 41Ra allow the light beams emitted inside the units 40L, 40R to be transmitted to outside the vehicle body. Through the lens surfaces 41La, 41Ra, the interior of the units 40L, 40R can be seen.

Figure 2:
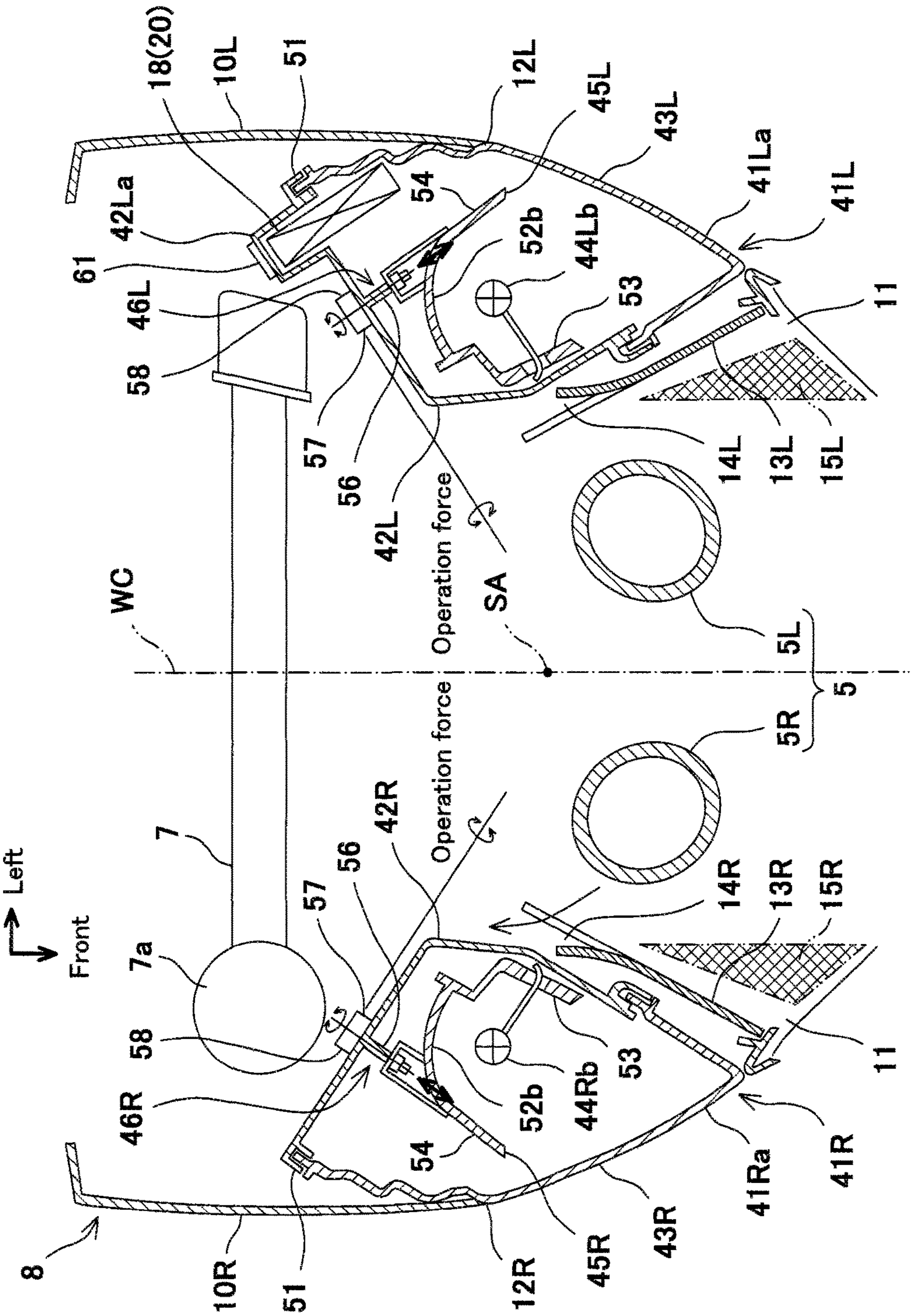
FIG. 2 is a cross-sectional plan view showing the front portion of the motorcycle.

FIG. 2 is a cross-sectional plan view showing the front portion of the motorcycle 1. As shown in FIG. 2, the cover member 8 includes left and right air guiding plates 13L, 13R. The left air guiding plate 13L is mounted on the left side cowling 10L and extends rearward from a left longitudinal edge 11*a* of the left side cowling 10L which defines the air opening 11. The right air guiding plate 13R is mounted on the right side cowling 10R and extends rearward from a right longitudinal edge 11*b* of the right side cowling 10R which defines the air opening 11. The left and right CL units 40L, 40R are disposed outward of the left and right air guiding plates 13L, 13R, respectively, in the vehicle width direction in such a manner that the lens surfaces 41La, 41Ra are smoothly continuous with the outer surfaces of the side cowlings 10L, 10R, respectively. The radiator 7 is disposed rearward of the air guiding plates 13L, 13R.

By providing the air guiding plates 13L, 13R, the air flowing from the front is faired and guided to the radiator 7. This can increase coolant cooling efficiency. Even in a layout in which the CL units 40L, 40R are disposed close to the air opening 11, the air guiding plates 13L, 13R can hide the inside regions of the CL units 40L, 40R in the vehicle width direction, respectively. Since the CL units 40L, 40R cannot be easily seen through the air opening 11, the external appearance of the motorcycle 1 can be maintained.

The air opening 11 is provided rearward of the front wheel 2. The front fork 5 extends from a region rearward of the front cowling 9 to the front axle 2*a* disposed in front of the left and right side cowlings 10L, 10R, through the air opening 11. The rods 5L, 5R are located outward of the vehicle width center line WC in the vehicle width direction and extend in the vehicle width direction without an inclination. The left air guiding plate 13L and the left longitudinal edge 11*a* have a recess 14L depressed outward in the vehicle width direction, in a portion facing the front fork 5. When the handle 16 (see FIG. 1) is rotated from the straight-traveling position, the left rod 5L rotates around the steering axis SA overlapping with the vehicle width center line WC in the front view, through the recess 14L. In the same manner, the right air guiding plate 13R and the right longitudinal edge 11*b* have a recess 14R, and the right rod 5R rotates around the steering axis SA through a recess 14R.

The housings 41L, 41R include housing bases 42L, 42R, respectively, located at the rear, and lens covers 43L, 43R attached on the housing bases 42L, 42R, respectively, from the front. The housing bases 42L, 42R are members manufactured by casting or resin molding. The CL units 40L, 40R are mounted on the vehicle body in a state in which the die-cutting directions of the housing bases 42L, 42R are inclined with respect to the forward and rearward direction in such a manner that the die-cutting directions are oriented more outward in the vehicle width direction, toward the front. In this configuration, escape spaces 15L, 15R with a triangular shape in a plan view are formed with respect to a case where the die-cutting directions of the housing bases 42L, 42R are oriented in the forward and rearward direction. The rotation trajectories of the rods 5L, 5R pass through the recesses 14L, 14R, respectively, and then through the escape spaces 15L, 15R, respectively. In this way, because of the inclination of the die-cutting directions, the CL units 40L, 40R can be disposed close to the air opening 11, without interfering with a steering operation. In addition, since the lens surfaces 41La, 41Ra face outward in the vehicle width direction, it becomes possible to easily obtain an irradiation range which is close to the center of a turn radius in the forward region of the vehicle body, while the motorcycle 1 is turning.

The left housing base 42L includes a protruding portion 42La extending in a rectangular shape, rearward from the outer portion in the vehicle width direction and upper portion, of a rear wall of the left housing base 42L. As will be described later, the left CL unit 40L is integrated with an electronic control unit 18 (to be precise, a second unit 20 of the electronic control unit 18). The electronic control unit 18 (the second unit 20) has a box-like unit with a rectangular cross-section. The electronic control unit 18 (the second unit 20) is accommodated in the left housing 41L. A portion of the electronic control unit 18 (the second unit 20) is fitted to the inside portion of the protruding portion 42La. In contrast, in the present embodiment, unlike the left CL unit 40L, the right CL unit 40R does not accommodate the electronic control unit 18 therein. For this reason, in the right CL unit 40R, the rear wall of the right housing base 42R is flat without a protrusion.

In a schematic configuration, the radiator 7 is disposed between the CL units 40L, 40R in the vehicle width direction, and rearward of the CL units 40L, 40R. More specifically, the outer end portions of the radiator 7 in the vehicle width direction are located inward of the outer end portions of the CL units 40L, 40R in the vehicle width direction, respectively, and outward of the inner end portions of the CL units 40L, 40R in the vehicle width direction, respectively. The front end portion of the radiator 7 is located rearward of the front end portions of the CL units 40L, 40R, and forward of the rear end portions of the CL units 40L, 40R. In this way, the radiator 7 is close to the left and right CL units 40L, 40R in the forward and rearward direction and in the vehicle width direction.

The left end portion of the radiator 7 is close to the protruding portion 42La of the left housing base 42L. The right end portion of the radiator 7 is close to the outer portion in the vehicle width direction, of the rear wall of the right housing base 42R. The radiator 7 includes a radiator cap 7*a* attached on the upper surface of the right end portion. In a plan view (when viewed from above), the right end portion of the radiator 7 has a contour larger than that of the left end portion of the radiator 7. Since the electronic control unit 18 and the radiator cap 7*a* are disposed on left and right sides, respectively, the radiator 7 can be located close to the left and right CL units 40L, 40R in the forward and rearward direction and in the vehicle width direction (close to the left and right CL units 40L, 40R in the plan view).

Turning back to FIG. 1, since the CL units 40L, 40R can be disposed inward in the vehicle width direction, without interfering with the steering operation, as described above, the CL units 40L, 40R can be located inward in the vehicle width direction, relative to the tip end portions of steps 16 on which the rider's feet are rested or the tip end portions of the handle 6. In this layout, even in a case where the motorcycle 1 falls to the right or to the left, damages to the CL units 40L, 40R can be suppressed.

The left CL unit 40L includes a plurality of (e.g., three) left light source members 44La to 44Lc. The left light source members 44La to 44Lc are constituted by, for example, light emitting diodes (LEDs). Alternatively, the left light source members 44La to 44Lc may be constituted by, for example, halogen bulbs. The left light source members 44La to 44Lc can be turned on and off independently of each other. When the left light source members 44La to 44Lc are turned on, and emit the light beams, the emitted light beams are transmitted through the lens surface 41La, and the forward region of the vehicle body is irradiated with the light beams. The left light source members 44La to 44Lc are arranged in the vertical direction. The light source member 44La on a lower side is turned on when the bank angle θ of the vehicle body is relatively small. In contrast, the light source member 44Lc on an upper side is turned on when the bank angle θ of the vehicle body becomes relatively large. As in the left CL unit 40L, the right CL unit 40R includes a plurality of right light source members 44Ra to 44Rc.

Figure 3:
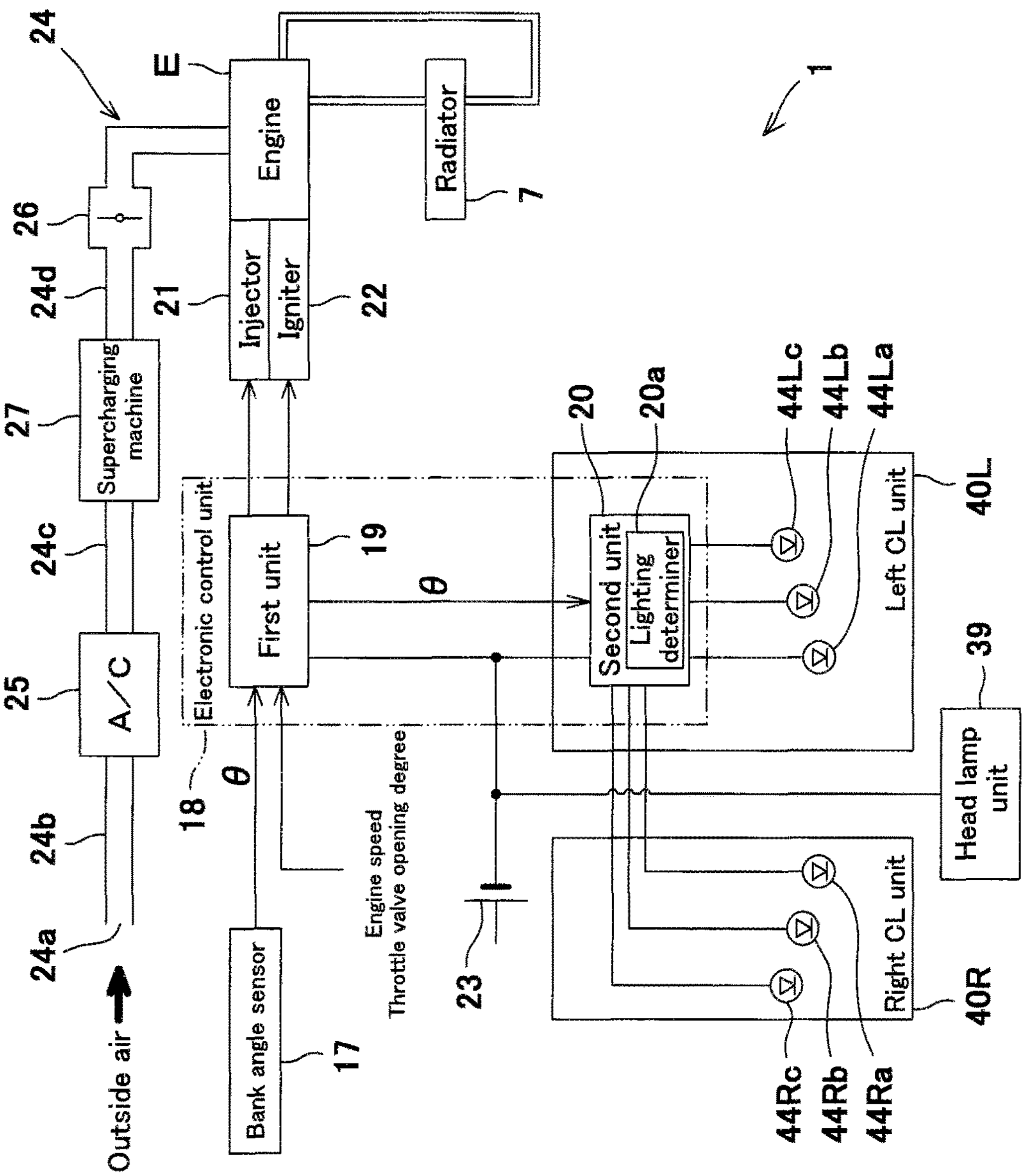
FIG. 3 is a conceptual view showing the configuration of the motorcycle.

FIG. 3 is a conceptual view showing the configuration of the motorcycle 1. The motorcycle 1 includes a bank angle sensor 17 which detects the bank angle θ of the vehicle body, and the electronic control unit 18 which controls turn on and off of the CL units 40L, 40R. The bank angle sensor 17 is configured to output a detection signal indicating the bank angle θ to the electronic control unit 18. The electronic control unit 18 determines whether the left and right light source members 44La to 44Lc, 44Ra to 44Rc are to be turned on or off, based on the bank angle θ detected by the bank angle sensor 17.

The electronic control unit 18 may include a plurality of control units which are physically separated. A part of the plurality of control units may be integrated with the CL unit. In the present embodiment, for example, the electronic control unit 18 includes two electronic control units which are a first unit 19 and the second unit 20. As described above, the second unit 20 is integrated with the left CL unit 40L. The first unit 19 is disposed at a suitable location of the motorcycle 1, as a component which is independent of the left and right CL units 40L, 40R. The right CL unit 40R is not integrated with the electronic control unit 18. The right light source members 44Ra to 44Rc of the right CL unit 40R are connected to the second unit 20 inside the left CL unit 40 via electric wires.

For example, the first unit 19 is realized by a vehicle control unit which controls power of a driving power source. Information (e.g., engine speed or throttle valve opening degree) required to control the power of the driving power source is output to the first unit 19. A detection signal of the bank angle sensor 17 may also be output to the first unit 19, and information relating to the bank angle θ may be used to control the power of the engine E.

In the present embodiment, the engine E is used as a part or whole of the driving power source. The first unit 19 controls the operation of an injector 21 and the operation of an igniter 22 of the engine E based on received information. The information indicating the bank angle θ is transmitted from the first unit 19 to the second unit 20. The second unit 20 includes a lighting determiner section 20*a* which determines whether the light source members 44La to 44Lc, 44Ra to 44Rc are to be turned on or off, based on the received bank angle θ.

The motorcycle 1 includes a battery 23 as an electric power supply for electric constituents mounted in the motorcycle 1. Examples of the electric constituents mounted in the motorcycle 1 are a light source of the head lamp unit 39, the light source members 44La to 44Lc, 44Ra to 44Rc of the CL units 40L, 40R, and the electronic control unit 18 (the first unit 19 and the second unit 20). The second unit 20 is constituted by a board on which a memory, a CPU, and an input/output interface which implement the lighting determiner section 20*a* are mounted. A power supply circuit of the light source members 44La to 44Lc, 44Ra to 44Rc may also be mounted on this board.

The engine E is a liquid-cooled engine. The motorcycle 1 includes the above-described radiator 7 as a constituent in an engine cooling system. The motorcycle 1 includes a duct member 24, an air cleaner box 25, and a throttle valve 26 as constituents of an engine air-intake system. In the present embodiment, the engine E is equipped with a supercharging machine 27. The supercharging machine 27 may be a mechanical supercharger which uses an engine output shaft or an electric motor as a driving force source, or a turbo charger which uses an engine exhaust gas as the driving force source.

The duct member 24 includes an air-intake duct member 24*b* which takes in outside air from an air-intake inlet 24*a* and guides the air toward a dirty side of the air cleaner box 25, a supercharging machine supply duct member 24*c* which guides cleaned air from a clean side of the air cleaner box 25 to a compressor of the supercharging machine 27, and an air supply duct member 24*d* which guides supercharged air from the compressor of the supercharging machine 27 to the intake port of the engine E. The throttle valve 26 is provided in the air supply duct member 24*d*. The air-intake inlet 24*a* is positioned at an upstream end in an air flow direction in the engine air-intake system.

Turning back to FIG. 1, the air-intake inlet 24*a* is disposed at the front portion of the vehicle body. For example, the air-intake inlet 24*a* is provided in one of the left and right side cowlings 10L, 10R (the left side cowling 10L in the illustrated example), to be precise, a portion of one of the left and right side cowlings 10L, 10R, which defines the external appearance in a front view. The air-intake inlet 24*a* is adjacent to the head lamp unit 39 in the vehicle width direction. The air-intake inlet 24*a* is adjacent to the head lamp unit 39 in the vehicle width direction and is disposed above the CL units 40L, 40R and inward of the CL units 40L, 40R in the vehicle width direction.

Hereinafter, the structure of the left CL unit 40L will be described in detail. The detailed description of the right CL unit 40R is omitted. The right CL unit 40R has substantially the same structure (although its structure is reversed in the rightward and leftward direction) as that of the left CL unit 40L except that the right CL unit 40R does not accommodate therein the electronic control unit 18 (the second unit 20) and thereby the shape of the rear portion of the housing 41R of the right CL unit 40R is different from that of the rear portion of the housing 41L of the left CL unit 40L.

Figure 4:
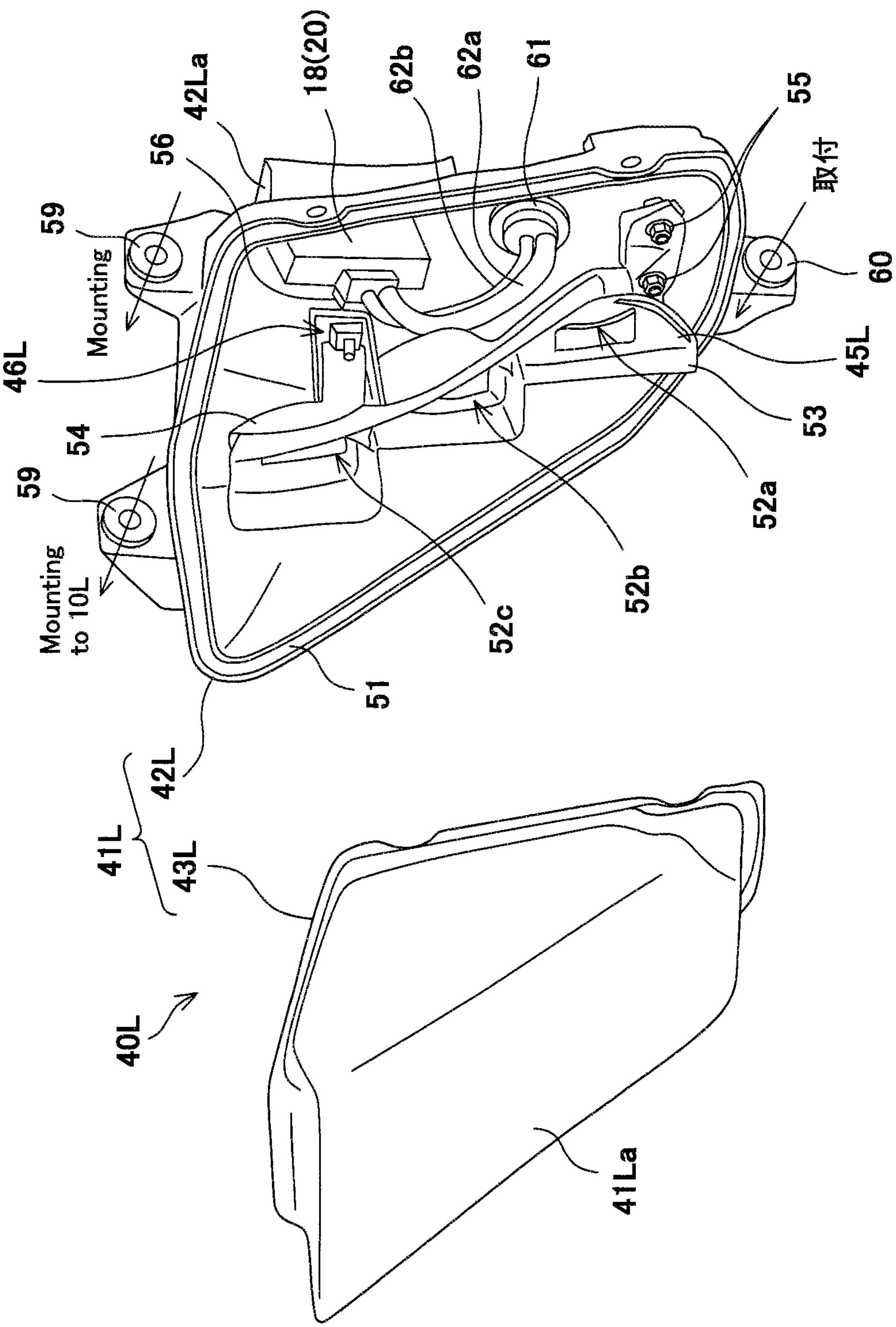
FIG. 4 is an exploded perspective view of a left cornering lamp unit (left CL unit).

As shown in FIG. 4, the left CL unit 40L includes the housing 41L, the light source members 44La to 44Lc, a reflector 45L, an optical axis adjustment mechanism 46L, and the electronic control unit 18 (the second unit 20).

The housing base 42L has a bowl shape which opens in the forward direction. The housing base 42L has a peripheral groove 51 surrounding an opening formed on the front portion of the housing base 42L. The lens cover 43L has a bowl shape which opens in a rearward direction. An opening edge provided at the rear portion of the lens cover 43L is engaged with the peripheral groove 51. In this way, the lens cover 43L is attached on the housing base 42L, and the housing 41L forms a closed inner space. The lens cover 43L mainly has a front wall, an upper wall, a lower wall, an inner side wall, and an outer side wall. The walls other than the front wall are engaged with the peripheral groove 51. Only the front wall of the lens cover 43L is exposed through the opening 12L of the side cowling 10L, while the other walls are hidden by the side cowling 10L (and the air guiding plate 13L) (see FIG. 2). The front wall of the lens cover 43L defines the lens surface 41La.

Figure 5:
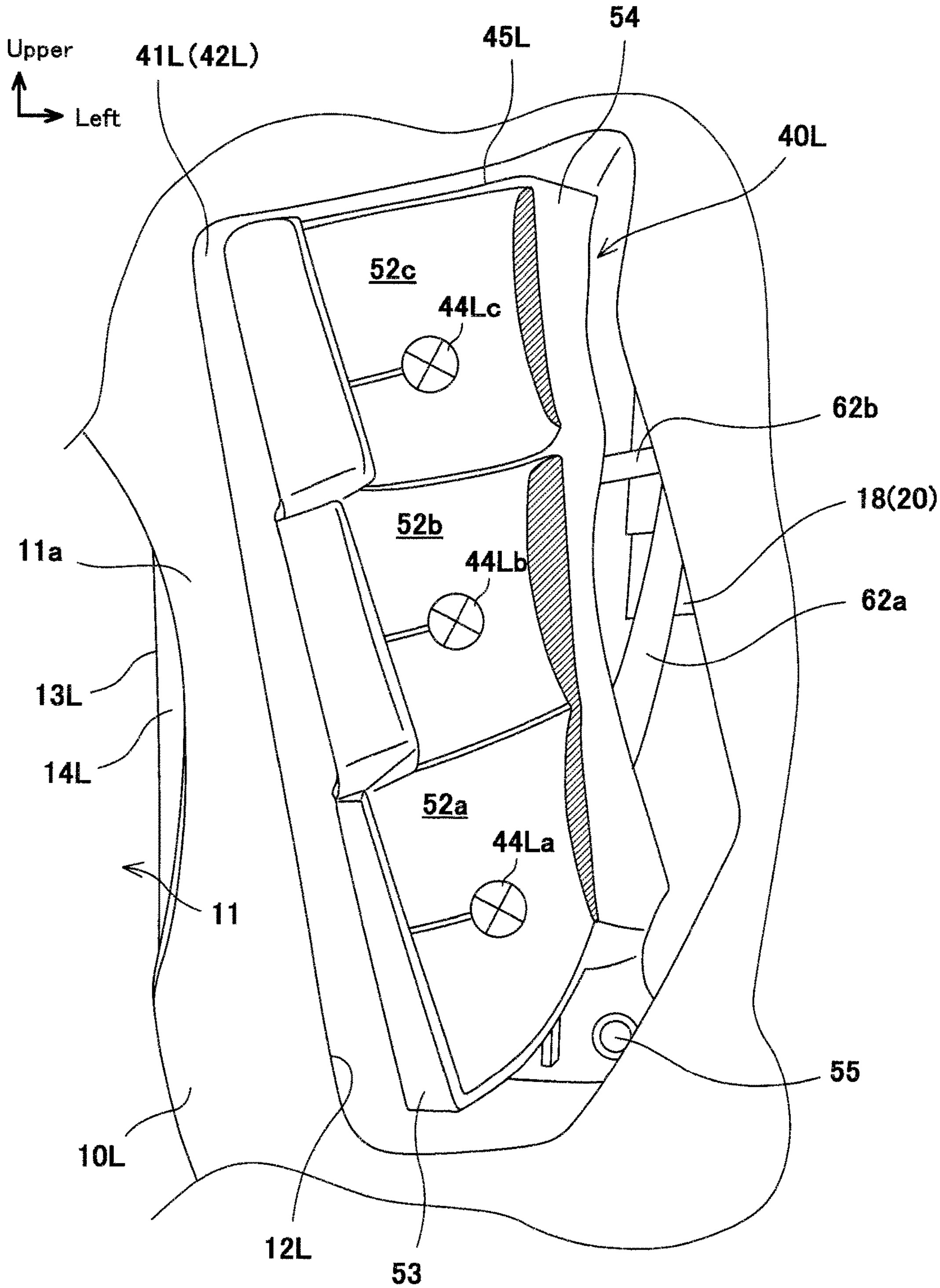
FIG. 5 is a front view of a left side cowling and the left CL unit in a state in which a lens cover is detached.

FIG. 5 is a front view of the left side cowling 10L and the left CL unit 40L in a state in which the lens cover 43L is detached. Referring to FIG. 5, the reflector 45L is accommodated in the housing 41L, and configured to reflect the light beams emitted from the plurality of left light source members 44La to 44Lc. The reflector 45L includes a plurality of reflection sections 52*a* to 52*c* which are integrated with each other and correspond to the plurality of left light source members 44La to 44Lc, respectively. The number of the plurality of left light source members 44La to 44Lc is equal to the number of the plurality of reflection sections 52*a* to 52*c* (three in the present embodiment). Each of the plurality of reflection sections 52*a* to 52*c* has a substantially semi-cylinder shape, and the depressed surface thereof faces in the forward direction. As in the left light source members 44La to 44Lc, the reflection sections 52*a* to 52*c* are arranged in the vertical direction. The reflector 45L and the housing 41L accommodating the reflector 45L therein are elongated in the vertical direction.

The reflector 45L includes an inner side wall 53 and an outer side wall 54 extending in the vertical direction, on the both sides of the three reflection sections 52*a* to 52*c*. The three reflection sections 52*a* to 52*c* are integrated with each other by the side walls 53, 54. The second unit 20 is disposed outward of the outer side wall 54 in the vehicle width direction. In this layout, the second unit 20 is not easily seen from an outside region in the vehicle width direction. Therefore, the external appearance of the motorcycle 1 is not degraded.

The light source members 44La to 44Lc are configured to emit the light beams inside the housing 41L. The light source members 44La to 44Lc are surrounded by the depressed surfaces of the corresponding reflection sections 52*a* to 52*c*, respectively. The reflection sections 52*a* to 52*c* reflect substantially in the forward direction the light beams emitted from the corresponding light source members 44La to 44Lc, respectively.

Turning back to FIG. 4, the optical axis adjustment mechanism 46L supports the reflector 45L on the housing 41L in such a manner that the reflector 45L is tiltable with respect to the housing 41L. The optical axis adjustment mechanism 46L can change the posture of the reflector 45L with respect to the housing 41L. This makes it possible to change the directions of the optical axes of the light beams emitted from the light source members 44La to 44Lc, in particular, the directions of the optical axes of the light beams reflected by the reflector 45L. Since the plurality of (three) reflection sections 52*a* to 52*c* are integrated with each other, the three reflection sections 52*a* to 52*c* are tilted together when the posture of the reflector 45L is changed, and thus the directions of the optical axes of the three light source members 44La to 44Lc are changed together.

The optical axis adjustment mechanism 46L includes a lower fastening section 55 and an upper fastening section 56. The lower fastening section 55 serves to fasten the lower portion of the reflector 45L to the housing 41L. The upper fastening section 56 serves to fasten the upper portion of the reflector 45L to the housing 41L.

Figure 6:
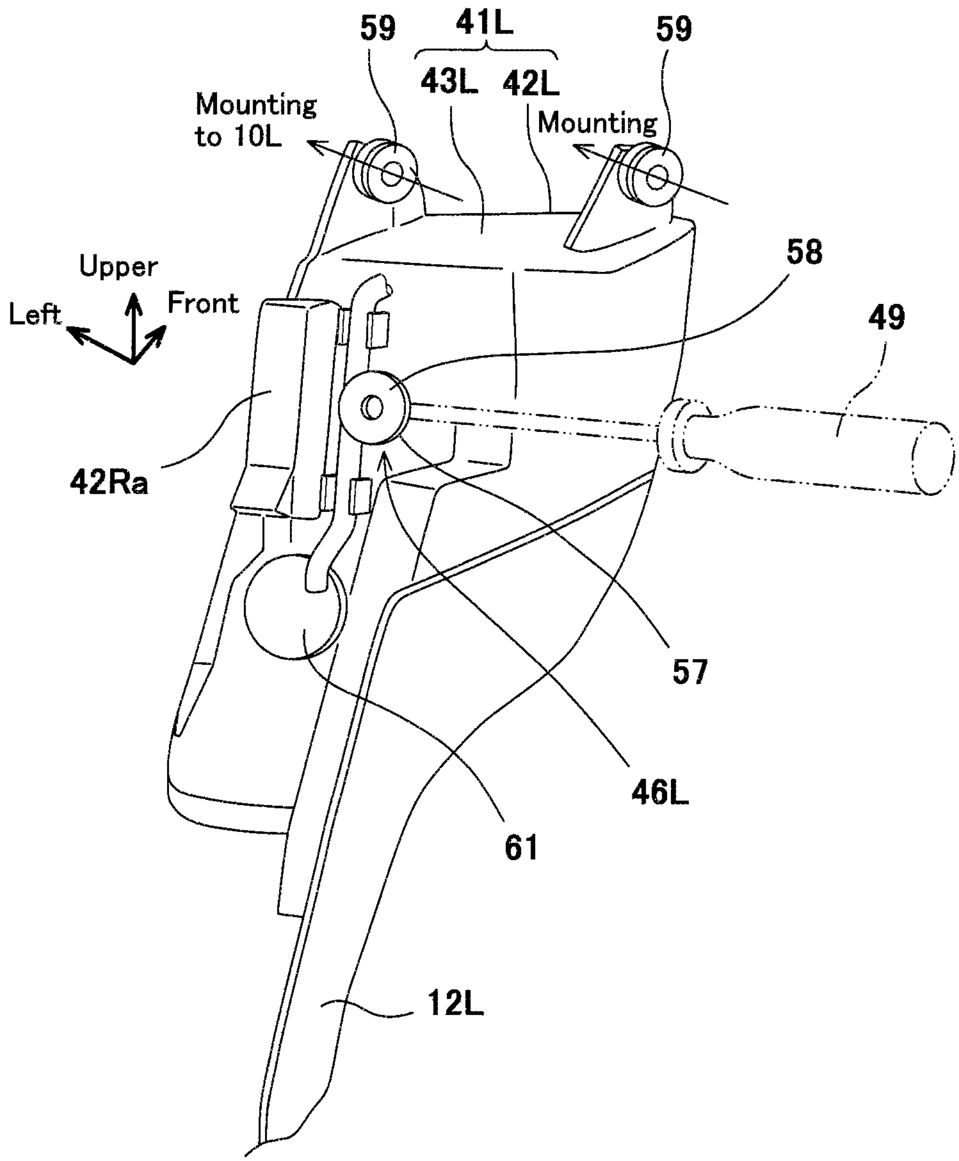
FIG. 6 is a perspective view of the left CL unit when viewed from the rear.

FIG. 6 is a perspective view of the left CL unit 40L when viewed from the rear. With reference to FIGS. 4 and 6, the optical axis adjustment mechanism 46L includes an operation section 57 to which an operation force is input by the rider, and a tilt mechanism 58 which tilts the reflector 45L in response to the operation force input to the operation section 57. The operation section 57 is disposed on the outer rear surface of the housing 41L. The operation section 57 faces inward in the vehicle width direction. The upper fastening section 56 has a shaft-like member and extends forward from the operation section 57. As the operation force, a rotational force applied by operating a tool 49 such as a screw driver by the rider is input to the operation section 57. In response to the rotational force input to the operation section 57, the tilt mechanism 58 advances or retracts the upper fastening section 56 in the forward and rearward direction with respect to the housing 41L. When the rotational force in a specified direction is input to the operation section 57, the upper fastening section 56 is advanced in the forward direction, while when the rotational force in an opposite direction is input to the operation section 57, the upper fastening section 56 is retracted in the rearward direction. As described above, the lower fastening section 55 serves to fasten the lower portion of the reflector 45L to the housing 41L.

Therefore, when the upper fastening section 56 is advanced in the forward direction, the reflector 45L rotates around an axis extending substantially in the vehicle width direction in the vicinity of the lower fastening section 55 in such a manner that the upper portion of the reflector 45L falls to the front. When the upper fastening section 56 is retracted in the rearward direction, the reflector 45L rotates around the axis extending substantially in the vehicle width direction in the vicinity of the lower fastening section 55 in such a manner that the upper portion of the reflector 45L rise to the rear. The posture of the reflector 45L is changed. When the reflector 45L falls to the front, the optical axis is manually adjusted to be oriented in the downward direction. When the reflector 45L rises to the rear, the optical axis is manually adjusted to be oriented in the upward direction.

Turning back to FIG. 1, each of the operation sections 57 is disposed below the head lamp unit 39 and above the front fender 4. Between the head lamp unit 39 and the front fender 4, a clearance 28 defined by the upper portion of the air opening 11 is formed. The rider inserts the hand holding the tool 49 into the inside of the cover member 8 through the clearance 28 (the air opening 11), causes the tip end of the tool 49 to be engaged with the operation section 57 facing inward in the vehicle width direction, and rotates the tool 49. In this way, the optical axis is manually adjusted by the operation of the optical axis adjustment mechanism 46L.

Although not shown, the head lamp unit 39 includes an optical axis adjustment mechanism, separately from the optical axis adjustment mechanism 46L. Even when the operation force is input to the operation section 57, the optical axis of the head lamp unit 39 is not adjusted. In other words, the optical axis adjustment mechanism 46L changes the posture of the reflector 45L, independently of the optical axis of the head lamp unit 39.

Turning back to FIG. 6, the housing 41L includes a plurality of mounting sections 59, 60, to mount the housing 41L to the vehicle body. The left CL unit 40L is mounted on, for example, the inner surface of the left side cowling 10L. The left CL unit 40L is mounted on the vehicle body by use of fastening members such as bolts. Each of the mounting sections 59, 60 includes a flange protruding upward or downward from the housing base 42L, and a collar which is fitted to the flange and into which the fastening member is inserted. The fastening members are not exposed on the outer surface of the left side cowling 10L. Therefore, the external appearance of the motorcycle 1 is not degraded. The plurality of mounting sections 59, 60 include a plurality of upper mounting sections 59 provided on the upper portion of the housing 41L, and at least one lower mounting section 60 provided on the lower portion of the housing 41L. The number of the upper mounting sections 59 is larger than the number of the lower mounting section(s) 60. In the present embodiment, for example, two upper mounting sections 59 and one lower mounting section 60 are provided. The left CL unit 40L is mounted on the vehicle body (e.g., the left side cowling 10L) at more points in the upper portion thereof than in the lower portion thereof.

A connector 61 is disposed below the protruding portion 42La. A cable 62 extending from the outside of the left CL unit 40L is connected to the connector 61. The cable 62 is a single cable including a power wire and a signal line which are unified. As shown in FIG. 4, inside the housing 41L, a power wire 62*a* and a signal line 62*b* which are separated from each other are connected to the second unit 20.

Figure 7:
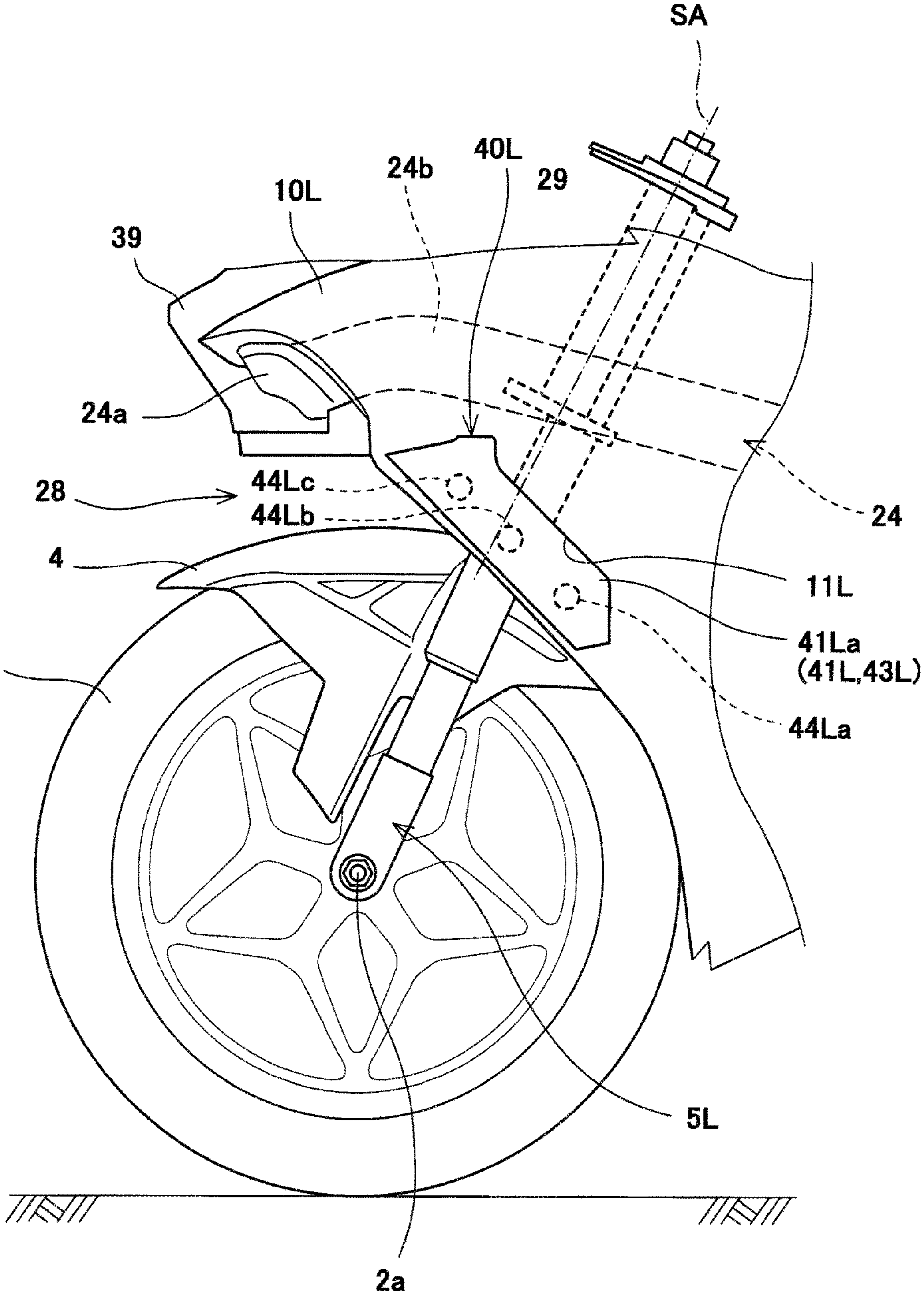
FIG. 7 is a left side view showing the front portion of the motorcycle.

FIG. 7 is a left side view showing the front portion of the motorcycle 1. The front edge of the left side cowling 10L extends in a straight line shape in the downward direction as it extends in the rearward direction. In the front view, the opening 12L extends in the vehicle width direction and in the vehicle height direction and defines the external appearance of the motorcycle 1 (see FIG. 1). In the side view, the opening 12L extends in the forward and rearward direction and in the vehicle height direction and defines the external appearance of the motorcycle 1. The lens surface 41La also defines the external appearance of the motorcycle 1 in the front view and in the side view. The left CL Unit 40L extends in a straight line shape in the downward direction as it extends in the rearward direction.

The duct member 24 (the air-intake duct member 24*b*) extends rearward from the air-intake inlet 24*a*. The left CL unit 40L is disposed inward of the air-intake duct member 24*b* in the vehicle width direction and below the air-intake inlet 24*a*. The upper edge of the left CL unit 40L is disposed along the lower edge of the air-intake duct member 24*b*. The motorcycle 1 includes a head pipe 29 disposed at the front portion of the motorcycle 1 and constituting the front end portion of a vehicle body frame. The left CL unit 40L is disposed below the lower end of the head pipe 29.

The motorcycle 1 configured as described above, as an example of the straddle vehicle, includes the cover member 8 covering the vehicle body, the head lamp unit 39 which is disposed at the front portion of the vehicle body and configured to emit the light beam with which the forward region of the vehicle body is irradiated, and the left and right CL units 40L, 40R as an example of the sub-light-unit which is provided separately from the head lamp unit 39 and emits the light beam with which the forward region of the vehicle body is irradiated. The left and right CL units 40L, 40R include the left and right housings 41L, 41R, respectively, disposed along the edge of the cover member 8, the plurality of left and right light source members 44La to 44Lc, 44Ra to 44Rc which emit the light beams inside the left and right housings 41L, 41R, the left and right reflectors 45L, 45R which are accommodated in the left and right housings 41L, 41R, respectively, and reflect the light beams emitted from the left and right light source members 44La to 44Lc, 44Ra to 44Rc, and the left and right optical axis adjustment mechanisms 46L, 46R which support the left and right reflectors 45L, 45R on the left and right housings 41L, 41R in such a manner that the reflectors 45L, 45R are tiltable with respect to the housings 41L, 41R, respectively, and change the postures of the reflectors 45L, 45R with respect to the housings 41L, 41R, respectively.

In accordance with this configuration, in a case where the optical axis adjustment mechanisms 46L, 46R tilt the reflectors 45L, 45R with respect to the housings 41L, 41R, respectively, to change the postures of the reflectors 45L, 45R with respect to the housings 41L, 41R, respectively, the directions of the optical axes of the light beams reflected by the reflectors 45L, 45R can be changed. Therefore, it is not necessary to form the clearances for allowing the changes the positions and postures of the housings 41L, 41R, between the housings 41L, 41R, and the edges of the openings 12L, 12R of the side cowlings 10L, 10R (see FIG. 2). Even in a case where the housings 41L, 41R are disposed without clearances (gaps) between the housings 41L, 41R and the edges of the openings 12L, 12R, the optical axes can be adjusted without generating the clearances (gaps). This makes it possible to improve the external appearance of the motorcycle 1 while enabling the optical axis adjustment.

In the optical axis adjustment, it is not necessary to change the positions and postures of the housings 41L, 41R with respect to the vehicle body. Therefore, it is not necessary to form clearances between the housings 41L, 41R, and the edges of the cover member 8, for allowing the changes of the positions and postures of the housings 41L, 41R. Even in a case where the housings 41L, 41R are disposed without clearances (gaps) between the housings 41L, 41R and the edges of the cover member 8, the directions of the optical axes can be adjusted. As a result, the external appearance of the motorcycle 1 can be improved, and a mounting accuracy may be reduced.

The optical axis adjustment mechanisms 46L, 46R include the operation sections 57, respectively, to which the operation force is input by the rider, and the tilt mechanisms 58 which tilt the reflectors 45L, 45R, respectively, in response to the operation force input to the operation sections 57. The operation sections 57 are disposed inside the cover member 8. In this layout, since the operation section 57 are not exposed, flexibility of external appearance design, in particular, flexibility of the outer shape of the cover member 8 can be improved. In addition, the operation sections 57 are not contaminated by external foreign matters. This makes it possible to prevent a situation in which the operation sections 57 are broken by forcibly operating the operation sections 57 to which the foreign matters adhere.

The motorcycle 1 includes the front fender 4 which is disposed with the clearance 28 below the head lamp unit 39 and partially covers the front wheel 2. The operation sections 57 are disposed below the head lamp unit 39 and above the front fender 4. In this layout, the user of the motorcycle 1 inserts the rider's hand into the clearance 28 formed between the front fender 4 and the head lamp unit 39, and easily input the operation force to the operation section 57 provided inside the cover member 8, for example, by use of the tool 49 depending on the case. Therefore, the work for adjusting the optical axis can be easily performed, and the external appearance of the motorcycle 1 can be secured.

The plurality of light source members 44La to 44Lc, 44Ra to 44Rc are accommodated in the housings 41L, 41R. Each of the reflectors 35L, 35R includes the plurality of reflection sections 52*a* to 52*c* which are integrated with each other and correspond to the plurality of light source members 44La to 44Lc or 44Ra to 44Rc. The plurality of reflection sections 52*a* to 52*c* may be tilted together with respect to the housing 41L, 41R by the optical axis adjustment mechanism 46L, 46R. This makes it possible to adjust together the directions of the optical axes of the light beams emitted from the plurality of light source members 44La to 44Lc or 44Ra to 44Rc. As a result, the work for adjusting the optical axes can be easily performed.

The optical axis adjustment mechanisms 46L, 46R may change the postures of the reflectors 35L, 35R of the CL units 40L, 40R, respectively, independently of the optical axis of the head lamp unit 39. This allows the optical axis adjustment mechanisms 46L, 46R to adjust the directions of the optical axes of the light beams reflected by the reflectors 45L, 45R of the CL units 40L, 40R, independently of the optical axis of the head lamp unit 39.

The motorcycle 1 includes the electronic control unit 18 which determines whether the plurality of light source members 44La to 44Lc or 44Ra to 44Rc are to be turned on or off, and the electronic control unit 18 is accommodated in the left housing 41L. In this configuration, a control system hardware (the electronic control unit 18) which controls turn on of the light source members 44La to 44Lc or 44Ra to 44Rc is one of the constituents of the CL unit 40L and integrated as a unit with the plurality of light source members 44La to 44Lc and the reflector 45L. Therefore, quality control (management) and maintenance for the CL unit 40L can be easily performed.

The motorcycle 1 includes the duct member 24 which is the constituent of the engine air-intake system. The CL units 40L, 40R are disposed below the head lamp unit 39 and below the air-intake inlet 24*a* of the duct member 24.

In accordance with this layout, since the CL units 40L, 40R are disposed below heavy engine constituents, the center of gravity of the vehicle body can be lowered. In particular, since the CL units 40L, 40R are disposed vertically apart from the head lamp unit 39, the center of gravity of the front portion of the vehicle body is lowered.

The motorcycle 1 includes the head pipe 29 disposed at the front portion of the vehicle body, and the CL units 40L, 40R are disposed below the lower end of the head pipe 29. In this layout, the center of gravity of the vehicle body is lowered.

Each of the CL units 40L, 40R includes the plurality of mounting sections 59, 60 mounted on the vehicle body. The plurality of mounting sections 59, 60 include the plurality of upper mounting sections 59 provided on the upper portion of each of the CL units 40L, 40R and at least one lower mounting section 60 provided on the lower portion of each of the CL units 40L, 40R. The number of the upper mounting sections 59 is larger than that of the lower mounting section(s) 60. In this configuration, each of the CL units 40L, 40R is mounted on the vehicle body at more points in the upper portion thereof than in the lower portion thereof. The CL units 40L, 40R can be suspended. The CL units 40L, 40R which are heavy constituents can be easily supported by the vehicle body.

The motorcycle 1 includes the radiator 7 which radiates heat from the coolant, and the left and right air guiding plates 13L, 13R as an example of an air guiding member which guides the air flowing from the front to the radiator 7. The left and right CL units 40L, 40R are located outward of the left and right air guiding plates 13L, 13R, respectively, in the vehicle width direction, and are adjacent to the air guiding plates 13L, 13R, respectively. In this layout, the inner sides of the CL units 40L, 40R in the vehicle width direction can be hidden by the air guiding plates 13L, 13R, respectively. Therefore, the external appearance of the motorcycle 1 can be secured.

The motorcycle 1 includes the front wheel 2 as the steering wheel, and the front fork 5 which supports the front wheel 2 and is rotatable around the steering axis SA extending substantially in the vertical direction. The left and right air guiding plates 13L, 13R are disposed outward of the front fork 5 in the vehicle width direction. The CL units 40L, 40R are disposed outward of the air guiding plates 13L, 13R, respectively, in the vehicle width direction. Portions of the air guiding plates 13L, 13R, facing the front fork 5, have the recesses 14L, 14R, respectively, which are depressed outward in the vehicle width direction. During the steering operation, the front fork 5 is rotatable through the recesses 14L, 14R. Interference between the front fork 5 and the air guiding plates 13L, 13R can be avoided by forming the recesses 14L, 14R, instead of disposing the air guiding plates 13L, 13R and the CL units 40L, 40R at locations which are more outward in the vehicle width direction. The CL units 40L, 40R are disposed outward of the front fork 5 in the vehicle width direction while reducing the width (dimension in the vehicle width direction) of the front portion of the vehicle body.

The CL units 40L, 40R extend in a straight line shape in the downward direction as they extend in the rearward direction. With this shape, spaces in which the CL units 40L, 40R are disposed can be saved, and the light beams with a sufficient amount can be secured.

The cover member 8 (in particular, the front edges of the side cowlings 10L, 10R in the present embodiment) extends in the straight line shape in the downward direction as it extends in the rearward direction. The CL units 40L, 40R extend along the edges of the cover member 8 (the side cowlings 10L, 10R). This makes it possible to improve aerodynamic characteristics of the motorcycle 1 including the CL units 40L, 40R.

So far, the embodiment has been described. The above-described configuration can be suitably changed.

For example, although the housings 41L, 41R of the CL units 40L, 40R are disposed along the edges of the openings 12L, 12R formed in the left and right side cowlings 10L, 10R, respectively, which are an example of the cover member 8, and the edges of the openings 12L, 12R are formed in a closed loop shape, the edges of the cover member 8 may not be formed in the closed loop shape. For example, the housings 41L, 41R may be disposed along edges formed by cutting the front edges of the side cowlings 10L, 10R. The expression "the housings 41L, 41R may be disposed along the edges" means a state in which the housings 41L, 41R may be disposed without clearances (gaps) between the edges and the housings 41L, 41R. Also, the expression "the housings 41L, 41R may be disposed along the edges" means a state in which the flat surface of the cover member 8 is smoothly continuous with the exposed surfaces of the housings 41L, 41R.

The configuration of the electronic control unit 18 can be suitably changed. A control unit constituting the electronic control unit 18 may be accommodated in either one of the left and right CL units 40L, 40R.

Although the CL units 40L, 40R are described as the sub-light-units, the sub-light-units may be any light (lamp) units so long as they are provided separately from the head lamp unit 39 (the front lamp unit) to emit the light beams with which the forward region of the vehicle body is irradiated. For example, the sub-light-units may be fog lamps (lights).

Figure 8:
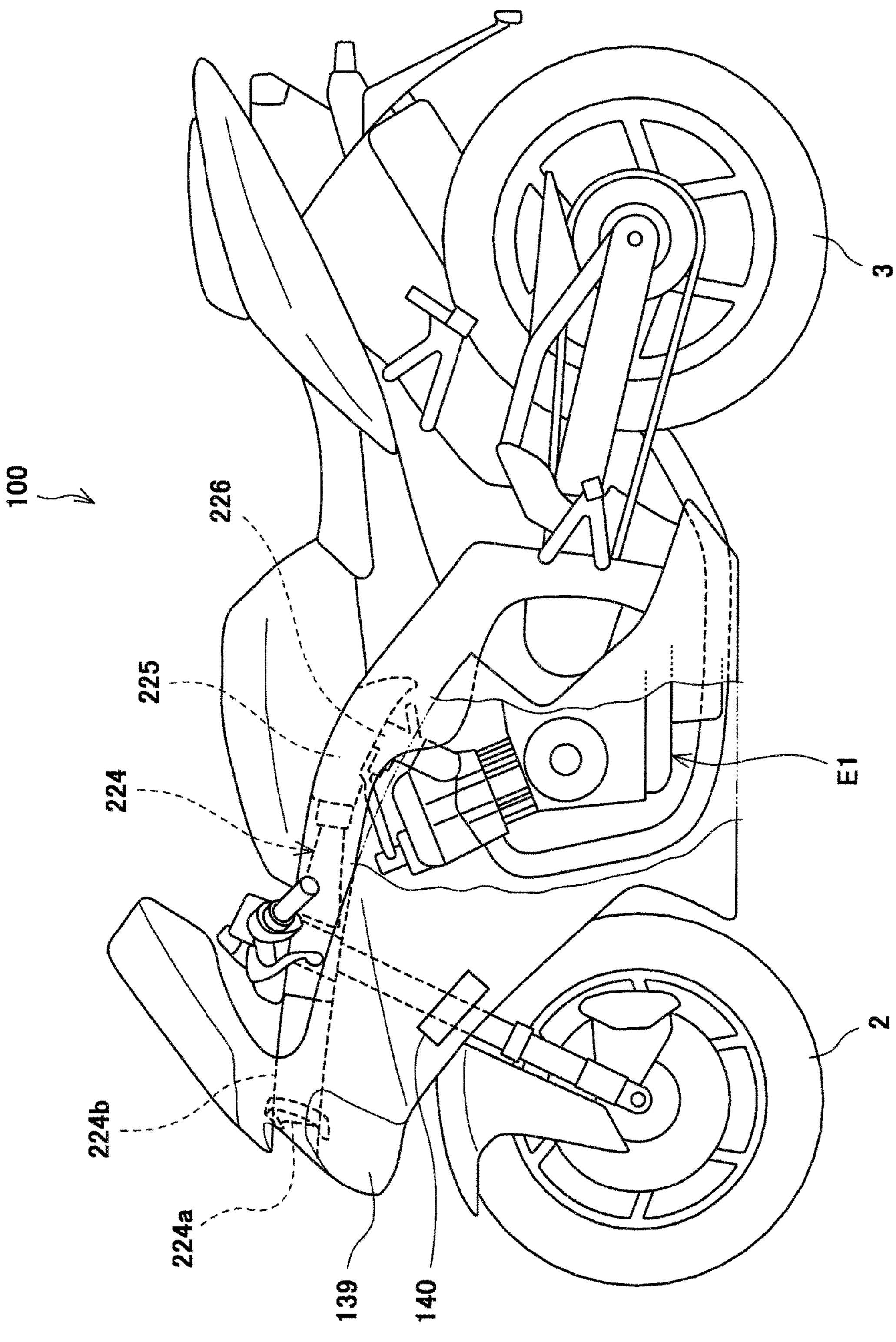
FIG. 8 is a side view of the motorcycle in which a naturally aspirated engine is mounted.

In a case where an engine is used as the driving power source of the motorcycle, the engine may be a naturally aspirated engine instead of an engine with a supercharging machine. In this case, as shown in FIG. 8, a motorcycle 100 includes a duct member 224, an air cleaner box 225, and a throttle valve 226, as constituents of the engine air-intake system. As in the above-described duct member 24, the duct member 224 includes an air-intake duct member 224*b* which takes in outside air through an air-intake inlet 224*a* and guides the air toward a dirty side of the air cleaner box 225, and an intake-air duct member 224*c* which guides cleaned air from a clean side of the air cleaner box 225 to the intake port of an engine E1. The throttle valve 226 is provided in the duct member 224. The air-intake inlet 224*a* is positioned at an upstream end in an air flow direction in the engine air-intake system and disposed at the front portion of the vehicle body. In this case, a CL unit 140 is disposed below a head lamp unit 139 and below the air-intake inlet 224*a* of the duct member 224. In this layout, the advantages as those of the above-described embodiment can be obtained.

Although the motorcycle 1 is described as an example of a straddle vehicle, in particular, a straddle vehicle which turns in a bank state, the present invention may be applied to straddle vehicles (e.g., automated three-wheeled vehicle, or four-wheeled buggy) other than the motorcycle 1.

The invention claimed is:

1. A straddle vehicle which turns in a bank state in which a vehicle body is rotated around an axis extending in a vehicle length direction, the straddle vehicle comprising:

a head lamp unit which is disposed at a front portion of the straddle vehicle and emits a light beam with which a forward region of the vehicle body is irradiated;

right and left cornering lamp units which are disposed at the front portion of the straddle vehicle, provided separately from the head lamp unit, and turned on in the bank state;

a duct member included in an engine air-intake system;

a bank angle sensor which detects a bank angle of the vehicle body; and an electronic control unit which turns the cornering lamp units on and off, wherein the cornering lamp units are disposed below the head lamp unit and below an air-intake inlet of the duct member, wherein each of the right and left cornering lamp units includes a plurality of light source members which can be turned on and off independently of each other, and the electric control unit determines whether or not each of the plurality of light sources is to be turned on or off based on the detected bank angle, and wherein the cornering lamp extends in a straight line shape that is slanted downward toward a rear of the straddle vehicle, and wherein the plurality of light source members are arranged in a vertical direction.

2. The straddle vehicle according to claim 1, further comprising:

a head pipe disposed at the front portion of the straddle vehicle, wherein the cornering lamp units are disposed below a lower end of the head pipe.

3. The straddle vehicle according to claim 1, wherein each of the right and left cornering lamp units includes a plurality of mounting sections attached on the vehicle body, and wherein the plurality of mounting sections include a plurality of upper mounting sections provided on an upper portion of the respective cornering lamp unit, and at least one lower mounting section provided on a lower portion of the respective cornering lamp unit, and the number of the plurality of upper mounting sections is larger than the number of the at least one lower mounting section.

4. The straddle vehicle according to claim 1, further comprising:

a radiator which radiates heat from a coolant; and an air guiding member which guides to the radiator air flowing from a front, wherein the cornering lamp units are each adjacent to the air guiding member at a respective location that is outward of the air guiding member in a vehicle width direction.

5. The straddle vehicle according to claim 4, further comprising:

a front wheel as a steering wheel; and a front fork which supports the front wheel and is rotatable around a steering axis extending substantially in a vertical direction, wherein the air guiding member is disposed outward of the front fork in the vehicle width direction and the cornering lamp units are disposed outward of the air guiding member in the vehicle width direction, and wherein a portion of the air guiding member, the portion facing the front fork, has a recess depressed outward in the vehicle width direction, and the front fork is rotatable through the recess during a steering operation.

6. The straddle vehicle according to claim 1, further comprising:

wherein the left cornering lamp unit includes a plurality of left light source members, and the right cornering lamp unit includes a plurality of right light source members which can be turned on and off, independently of the left light source members, and wherein the electronic control unit is configured to perform a determination process for the left light source members and the right light source members, based on the bank angle detected by the bank angle sensor, and configured to turn on the left cornering lamp unit in a left bank state in which the vehicle body is rotated to a left and turn on the right cornering lamp unit in a right bank state in which the vehicle body is rotated to a right.

7. A straddle vehicle which turns in a bank state in which a vehicle body is rotated around an axis extending in a vehicle length direction, the straddle vehicle comprising:

a head lamp unit which is disposed at a front portion of the straddle vehicle and emits a light beam with which a forward region of the vehicle body is irradiated;

a cornering lamp unit which is disposed at the front portion of the straddle vehicle, provided separately from the head lamp unit, and turned on in the bank state;

a head pipe disposed at the front portion of the straddle vehicle;

a bank angle sensor which detects a bank angle of the vehicle body; and an electronic control unit which turns the cornering lamp unit on and off, wherein the cornering lamp unit is disposed below a lower end of the head pipe and extends in a straight line shape that is slanted downward toward a rear of the straddle vehicle, and wherein the cornering lamp unit includes a plurality of light source members which can be turned on and off independently of each other, and the electric control unit determines whether or not each of the plurality of light source members is to be turned on or off based on the detected bank angle.

8. The straddle vehicle according to claim 7, further comprising:

a cover member covering the vehicle body, wherein the cover member extends in a straight line shape that is slanted downward toward the rear of the straddle vehicle, and the cornering lamp unit extends along an edge of the cover member.

* * * * *